United States Patent [19]
Manor

[11] 4,017,028
[45] Apr. 12, 1977

[54] TEMPERATURE DIFFERENTIAL SENSING AND CONTROL DEVICE

[76] Inventor: Giora Manor, 19 Kilmer Road, Larchmont, N.Y. 10538

[22] Filed: Feb. 28, 1975

[21] Appl. No.: 554,270

[52] U.S. Cl. .............................. 237/1 A; 73/368.1; 126/271; 236/91 F

[51] Int. Cl.² ......................... F24J 3/02; F16H 3/08

[58] Field of Search ........... 236/91, 78, 99 C, 91 R, 236/91 F, 91 A; 337/307, 308; 237/1 A; 73/368.1; 126/271, 400, 270; 62/209

[56] References Cited

UNITED STATES PATENTS

| | | | |
|---|---|---|---|
| 1,455,633 | 5/1923 | Lundgaard | 73/368.1 X |
| 2,211,672 | 8/1940 | Reeder | 236/99 |
| 3,007,017 | 10/1961 | Dwyer et al. | 73/407 UX |

Primary Examiner—William E. Wayner
Attorney, Agent, or Firm—Ladas, Parry, Von Gehr, Goldsmith & Deschamps

[57] ABSTRACT

Expansion of a fluid on increase in temperature is used to control a switch or other control output device. In one construction, two fixed quantities of fluid, separated by a flexible diaphragm, are in thermally-conductive contact with different respective regions, and change in the temperature relationship between the regions manifests itself as a change in the pressure across the diaphragm, thus displacing the diaphragm. Displacement of the diaphragm actuates a switch or a modulating control or indicating device. In other constructions, convective flow is used to influence a flow-sensitive device including a switch or a modulating control or indicating device.

6 Claims, 6 Drawing Figures

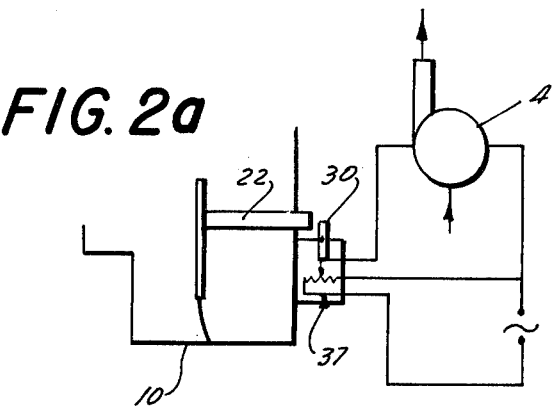
FIG. 2a
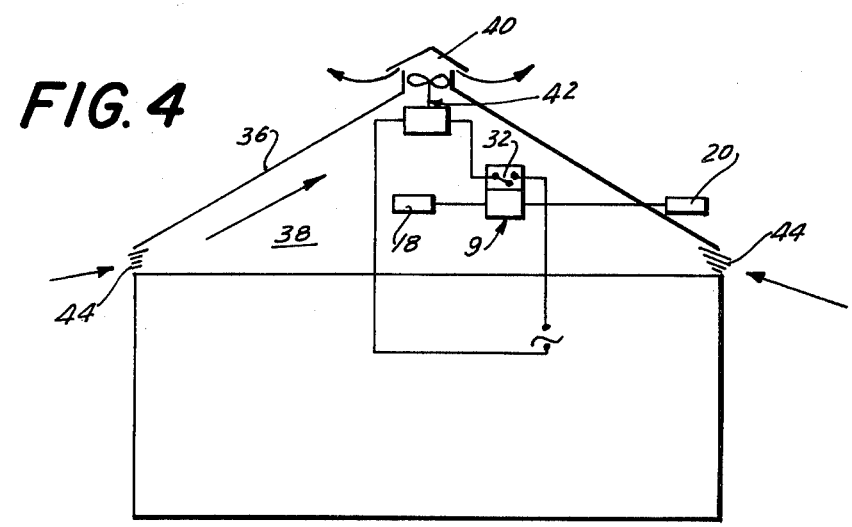
FIG. 3
FIG. 4

TEMPERATURE DIFFERENTIAL SENSING AND CONTROL DEVICE

This invention relates to differential thermostats. More particularly, the present invention provides a differential thermostat comprising a housing having mounted therewithin a flexible diaphragm which divides the interior of the housing into first and second chambers, first and second vessels having their interiors in communication with the first and second chambers respectively, the first vessel and the first chamber containing thermally expansible fluid sealed therewithin and the second vessel and the second chamber also containing thermally expansible fluid sealed therewithin, and the thermostat further comprising an actuating member mounted so as to be displaced by the diaphragm in dependence upon difference in pressure between the first and second chambers, and a switch mounted to be acted upon by the actuating member in dependence upon displacement thereof.

The differential thermostat described above may be used in a solar water heating system. Solar water heaters may be divided into two main types, each of which employs a solar collector which is mounted to receive incident solar radiation (insolation). In the case of household systems, the collector is normally mounted on the roof of the house. The solar collector, which is a well known device, has flow and return connections connected to inlet and outlet connections respectively of a storage tank. Water which has been heated in the collector passes into the storage tank by way of the inlet connection and cool water passes from the storage tank by way of the outlet connection to the collector for heating. The storage tank has a third connection, at the top, to enable heated water to be drawn off for household use. The main difference between the two types of system is that one employs forced flow and the other employs natural convective flow. Both types of systems have hitherto been subject to disadvantage. In the case of the convective flow system it is necessary that the top of the tank should be above the top of the solar collector, and if the collector is mounted on the roof of a house this in turn requires that the tank should be mounted on the roof. Since a storage tank full of water is very heavy, this implies special strengthening of the roof in order to support the tank, and also poses an architectural problem.

In the case of the forced circulation system, a pump is connected in the return pipe leading from the outlet connection of the storage tank to the collector, and as long as the pump operates water circulates through the collector and the tank. In the latter system it is not necessary to mount the storage tank on the roof of the house and it is in fact normally provided in its usual position in the basement. However, it is necessary to control the pump so that it does not circulate water all the time, since otherwise at night or on an overcast day the collector might radiate more heat than it collects, thus defeating the purpose of the system. An electronic differential thermostat has been proposed which detects the difference between the temperature of water in the inlet pipe to the storage tank and that of water in the outlet pipe and whenever the temperature of water in the inlet pipe is greater than the temperature of water in the outlet pipe by some small amount (say 4° to 5° C.) the pump remains switched on, while even the temperature of water in the inlet pipe falls below, or is equal to, the temperature of water in the outlet pipe the pump is switched off. However, this form of electronic differential thermostat has the disadvantage that it is expensive and represents a large part of the entire cost of a domestic solar water heating system. A suitable differential thermostat in accordance with the invention may be manufactured and installed for a much smaller cost.

For a better understanding of the invention, and to show how the same may be carried into effect, reference will now be made, by way of example, to the accompanying drawings in which:

FIG. 2a shows a modification of the thermostat shown in FIG. 2;

FIG. 3 shows a modification of the heating system shown in FIG. 1;

FIG. 4 shows an attic ventilation system employing the differential thermostat shown in FIG. 2.

Figure 1:
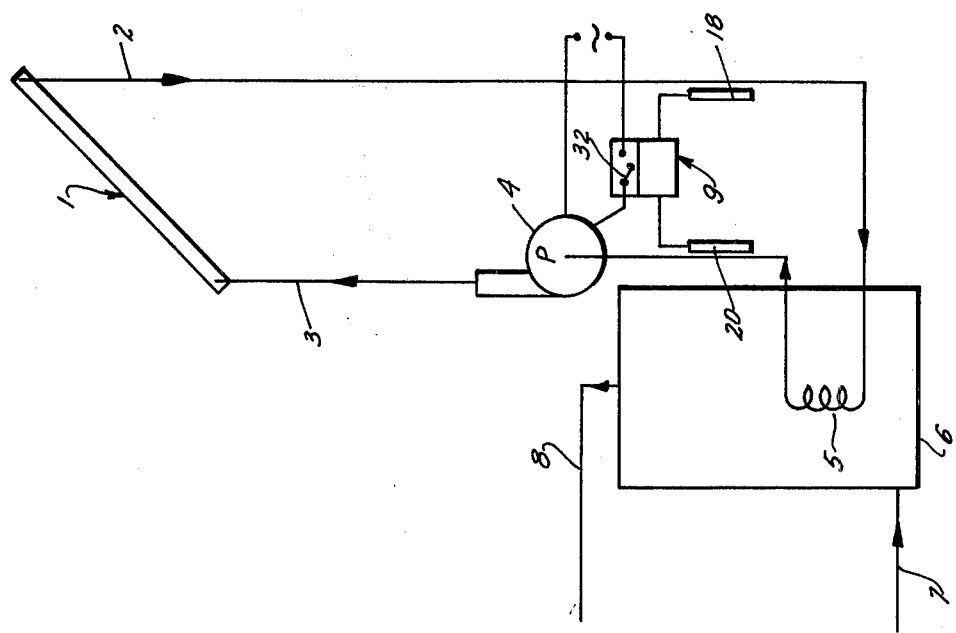
FIG. 1 shows diagrammatically a domestic solar water heating system.

The solar water heating system illustrated in FIG. 1 comprises a solar collector 1 of known type having a flow pipe 2 and a return pipe 3. The collector is connected in a closed circuit with an electric pump 4 and a heat exchanger 5 mounted inside a hot water storage tank 6. The storage tank 6 has a cold water inlet 7 at the bottom and a hot water outlet 8 at the top. When the illustrated system is in use the closed circuit containing the collector 1, the pump 4 and the heat exchanger 5 is filled with water and the water is driven to circulate by the pump 4 under control of a differential thermostat 9. Thus, water is delivered to the collector 1 and, as it passes therethrough, is heated by insolation. Heated water leaves the collector 1 by way of the flow pipe 2 and passes to the heat exchanger 5, where it gives up heat to water in the storage tank 6. Having given up heat, the circulating water passes once more by way of the pump to the collector 1, and so on.

Figure 2:
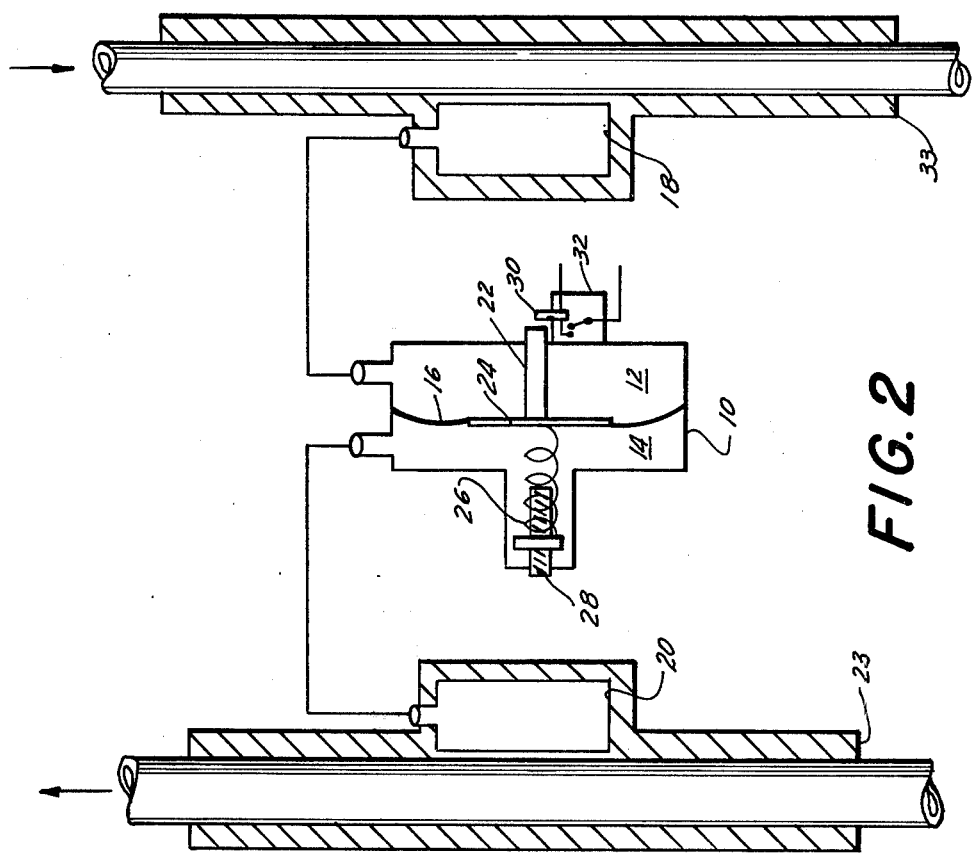
FIG. 2 shows a differential thermostat forming part of the heating system shown in FIG. 1.

The differential thermostat 9 shown in FIG. 1 is illustrated in greater detail in FIG. 2. From FIG. 2 it can be seen that the differential thermostat comprises a housing 10 defining an interior space which is divided into two chambers 12 and 14 by a flexible diaphragm 16. The two chambers 12 and 14 are connected to respective expansion bulbs 18 and 20 by way of capillary tubes.

The diaphragm 16 has a rigid support plate to one side of which is secured a rod 22 and to the other side of which is secured a spring retainer 24 over which is fitted one end of a helical spring 26. The other end of the helical spring 26 engages a nut carried by a set point adjustment screw 28. The rod 22 and the screw 28 both passes in fluid tight manner to the exterior of the housing 10. Outside the housing 10 the rod 22 engages the actuating member 30 of an electrical switch 32 which is connected in the control circuit of the pump 4. The expansion bulbs 18 and 20 are placed in good thermally conductive contact with the inlet and outlet pipes respectively of the heat exchanger 5. Thus, the pressure in each of the bulbs 18 and 20, and in the chambers 12 and 14 connected thereto, varies in dependence upon the inlet and outlet temperatures, and accordingly the diaphragm support plate, and the rod 22 secured thereto, takes up a position which depends upon the difference between the inlet and outlet temperatures and the setting of the screw 28.

In the system illustrated in FIGS. 1 and 2 the screw 28 is adjusted so that when the relationship between the pressures in the chambers 12 and 14 indicates that the temperature of the water in the inlet pipe has fallen to approximately 1° C. below the temperature of the water in the outlet pipe, the switch is opened and the pumps therefore switched off.

Starting of the pump is controlled by thermally insulating the pipes and sensing bulbs as shown at 33 in such a manner that when the pump has turned off as described above, about 20 minutes elapse before the temperatures in the pipes equalize and when the temperatures are equal the switch closes again and the pump is started. (The discrepancy between the temperature relationship at which the switch opens and that at which the switch closes arises because the thermostat has an inherent dead band corresponding to a temperature difference of about 1° C.)

If when the pump is started conditions are such that the collector is still losing heat, and the temperature in the inlet pipe again falls 1° C. below the temperature in the outlet pipe, the pump again switches off. However, if the collector is now receiving heat and the temperature in the inlet pipe does not fall 1° C. below the temperature in the outlet pipe, the switch remains closed and the pump continues to circulate water.

Instead of acting on a switch to produce an on-off output, the rod 22 may act on a potentiometer or the like to produce a proportional output, and the proportional output used to control an indicating device, providing an indication of temperature difference, or a variable speed pump. This possibility is shown in FIG. 2a, which shows the actuating member 30 acting on the sliding contact 31 of a potentiometer 33.

A more accurate and thermally more favorable, albeit more expensive, arrangement for controlling the pump is illustrated in FIG. 3. A time switch 34, controlled by a timer 39, is connected in parallel with the switch 32 and is arranged to be closed for a short period 30 minutes or so after the end of each operating interval of the pump and the screw 28 is set so that the switch 32 opens when the temperature in the inlet pipe falls to about 5° C. above the temperature in the outlet pipe and closes when the temperature difference increases to 6° C. If, at the end of the time the switch 34 is closed, the temperature difference is 6° C. or more the pump remains in operation by virtue of the switch 32 being closed. If the temperature difference is 5° C. or less the pump stops when the switch 34 times out and is not started again for another 30 minutes.

An optional photocell 35 is connected in the power line to the pump 4 and is set to allow operating current to flow only under daylight conditions: at night neither closing of the switch 32 nor closing of the switch 34 will lead to operation of the pump. The photocell may be omitted without serious loss of efficiency.

Of course, in the system shown in FIG. 1 it is not essential to use indirect heating of the water in the storage tank 6 by means of the heat exchanger 5: the outlet pipe from the heat exchanger could instead be connected directly to the top of the storage tank and the inlet pipe to the bottom of the storage tank and the water in the storage tank would then be heated both by circulating through the collector 1 and by mixing with heated water. However, the system shown in FIG. 1 has the advantage that the collector 1 is isolated from the water in the storage tank and accordingly problems of loading the collector with the pressure obtaining in the tank do not arise, and moreover antifreeze may be added to the water in closed circuit without contaminating the water in the tank.

Another possible use for the differential thermostat shown in FIG. 2 is for an attic fan control. An attic fan is used to ventilate the attic space of a house in the summer and should run only if the attic temperature is higher than the outside air temperature. Running the fan in the morning or on hot cloudy days when the outside temperature is higher than the attic temperature is undesirable. FIG. 4 illustrates diagrammatically a house having a roof 36 enclosing an attic space 38. The roof is provided at its ridge with a ventilator opening 40 in which an electric fan 42 is fitted. At the eaves of the roof are further ventilator openings 44. The electric fan is controlled by a differential thermostat 9 similar in construction to that shown in FIG. 2. The bulb 18 is mounted in the attic space 38 while the bulb 20 is mounted outside the house. The adjustment screw 28 is set so that the switch 32 closes and stops the fan when the attic temperature is slightly higher than the outside temperature but opens and thus stops the fan when the attic temperature is equal to or below the outside temperature.

Figure 5:
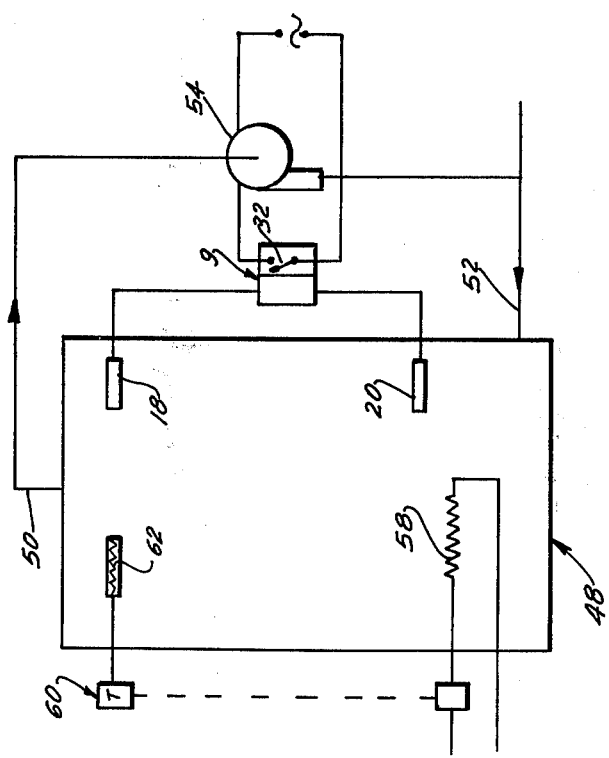
FIG. 5 shows a hot water storage tank fitted with a temperature equalization system employing the differential thermostat shown in FIG. 2.

Yet a further use for the differential thermostat shown in FIG. 2 is for temperature equalization in a hot water storage tank. In a hot water storage tank the heating element, be it gas, steam or electric, is generally controlled by a thermostat located at or near the top of the tank, where the hot water outlet is located. Since water demand on the storage tank is generally intermittent the water at the top of the tank prevents the heating element from being switched on since the temperature condition set by the thermostat is satisfied even though only the water at the top of the tank is at the desired temperature. This problem can be avoided by using the arrangement shown in FIG. 5 which illustrates a hot water storage tank 48 having a hot water outlet 50 and a cold water inlet 52 which are connected together through a small circulating pump 54 which is controlled by a differential thermostat 9. An electric heating element 58 controlled by a resistance thermostat 60 having its temperature sensor 62 at the top of the tank is located near the bottom of the tank. The bulb 18 is located near the top of the tank and the bulb 20 is located near the bottom of the tank and the adjustment screw 28 is set so that the switch 32 is closed, thus starting the pump 54, when the temperature at the top of the tank exceeds the temperature at the bottom of the tank by a small predetermined amount, and the switch opens, thus stopping the pump 54, when the temperature at the top of the tank is equal to the temperature at the bottom of the tank. If this equalized temperature is below the temperature set by the thermostat 60, the heating element is switched on and by virtue of the arrangement of the pump 54 and the differential thermostat 9, the water in the tank is kept at a uniform temperature, which increases the storage capacity.

It is to be understood that the invention is not limited to the specific constructions shown and described, as it will be apparent to those skilled in the art that changes may be made without departing from the principles of the invention as defined in the appended claims.

I claim:

1. A heating system comprising a heat collector, a thermal reservoir, a first conduit leading from the reservoir to the collector, a second conduit leading from the collector to the reservoir, an electrically-operable pump connected to pump fluid from the reservoir, through the first conduit, the collector and the second conduit and back to the reservoir, and a differential thermostat which comprises a housing having mounted therewithin a flexible diaphragm which divides the interior of the housing into first and second chambers, first and second vessels having their interiors in communication with the first and second chambers respectively, the first vessel and the first chamber containing thermally expansible fluid sealed therewithin and the second vessel and the second chamber also containing thermally expansible fluid sealed therewithin, the first vessel being in thermally conductive contact with the first conduit and the second vessel being in thermally conductive contact with the second conduit, and the thermostat further comprising an actuating member mounted so as to be displaced by the diaphragm in dependence upon difference in pressure between the first and second chambers, and a control device mounted to be acted upon by the actuating member in dependence upon displacement thereof and connected to control supply of operating current to the pump.

2. A heating system as claimed in claim 1, wherein the diaphragm is provided with a support plate and the housing contains resilient means biasing the support plate to oppose the force exerted on the diaphragm by pressure in one of said chambers.

3. A heating system as claimed in claim 2, wherein the resilient means comprise a helical spring having two opposite ends, one of said ends bearing against said support plate and the other end bearing against a stop member mounted in the housing in a position which is adjustable to vary the opposing force exerted on the diaphragm by said spring.

4. A heating system as claimed in claim 1, comprising a photosensitive device connected in series with said control device and arranged to prevent supply of current to the pump except when exposed to light substantially of daylight intensity.

5. A hot water storage system comprising a storage tank, an inlet pipe connected to admit cold water to the tank, an outlet pipe connected to withdraw cold water from the tank and located above the inlet pipe, a conduit connecting the outlet pipe to the inlet pipe, heating means at a lower portion of the tank, a control thermostat arranged to detect the temperature at an upper portion of the tank and control heating of water in the tank by the heating means in dependence upon the temperature sensed by the control thermostat, an electrically-operable pump connected in said conduit for pumping water from the outlet pipe to the inlet pipe, and a differential thermostat which comprises a housing having mounted therewithin a flexible diaphragm which divides the interior of the housing into first and second chambers, first and second vessels having their interiors in communication with the first and second chambers respectively, the first vessel and the first chamber containing thermally expansible fluid sealed therewithin and the second vessel and the second chamber also containing thermally expansible fluid sealed therewithin, the first and second vessels both being in thermally conductive contact with the interior of the tank with the second vessel positioned above the first vessel, and the thermostat further comprising an actuating member mounted so as to be displaced by the diaphragm in dependence upon difference in pressure between the first and second chambers, and a control device mounted to be acted upon by the actuating member in dependence upon displacement thereof and connected to the pump to control supply of operating current thereto.

6. A differential thermostat comprising a housing having mounted therewithin a flexible diaphragm which divides the interior of the housing into first and second chambers, first and second vessels having their interiors in communication with the first and second chambers respectively, the first vessel and the first chamber containing thermally expansible fluid sealed therewithin and the second vessel and the second chamber also containing thermally expansible fluid sealed therewithin, and the thermostat further comprising an actuating member mounted so as to be displaced by the diaphragm in dependence upon difference in pressure between the first and second chambers, a control device mounted to be acted upon by the actuating member in dependence upon displacement thereof, said diaphragm being provided with a support plate and the housing contains resilient means biasing the support plate to oppose the force exerted on the diaphragm by pressure in one of said chambers and wherein the resilient means comprise a spring having two opposite ends with one end bearing against said support plate and the other end bearing against a stop member mounted in the housing in a position which is adjustable to vary the opposing force exerted on the diaphragm by said spring.

* * * * *